United States Patent [19]

Conway

[11] Patent Number: 5,418,581
[45] Date of Patent: May 23, 1995

[54] HINGE SYSTEM FOR EYEWEAR

[75] Inventor: Simon M. Conway, Lima, N.Y.

[73] Assignee: Bausch & Lomb Incorporated, Rochester, N.Y.

[21] Appl. No.: 73,233

[22] Filed: Jun. 7, 1993

[51] Int. Cl.⁶ .............................................. G02C 5/22
[52] U.S. Cl. .................................. 351/116; 351/121; 351/140; 351/153
[58] Field of Search .................. 16/228, 267; 351/41, 351/44, 63, 111, 110, 116, 121, 140, 153; 2/12, 426, 428

[56]  References Cited

U.S. PATENT DOCUMENTS

| | | | |
|---|---|---|---|
| 2,210,507 | 8/1940 | Spill | 351/116 |
| 2,379,928 | 7/1945 | Rosenheim | 351/83 |
| 2,504,157 | 4/1950 | Rosenheim | 351/44 |
| 2,671,379 | 3/1954 | Eloranta | 351/111 |
| 3,394,980 | 7/1968 | Dym | 351/116 |
| 3,744,887 | 7/1973 | Dunbar | 351/153 |
| 4,017,165 | 4/1977 | Davis | 351/153 |
| 4,153,347 | 5/1979 | Myer | 351/92 |
| 4,670,915 | 6/1987 | Evans | 351/116 |
| 4,730,915 | 3/1988 | Jannard | 351/47 |
| 4,780,928 | 11/1988 | De Lorenzo Poz | 16/228 |
| 4,824,233 | 4/1989 | Jannard | 351/47 |

FOREIGN PATENT DOCUMENTS

| | | | |
|---|---|---|---|
| 0217763 | 4/1987 | European Pat. Off. | G02C 5/22 |
| 0495767 | 7/1992 | European Pat. Off. | 351/153 |
| 3404511 | 8/1985 | Germany | G02C 5/22 |
| 4241660 | 6/1993 | Germany | 351/153 |
| 576400 | 4/1946 | United Kingdom | G02C 5/22 |
| 588225 | 5/1947 | United Kingdom | G02C 5/22 |
| 608059 | 9/1948 | United Kingdom | G02C 5/22 |
| 734208 | 7/1955 | United Kingdom . | |
| WO90/01718 | 2/1990 | WIPO | G02C 5/22 |

Primary Examiner—William L. Sikes
Assistant Examiner—David R. Parsons
Attorney, Agent, or Firm—Salvatore P. Pace

[57]  ABSTRACT

An eyewear hinge system comprising a front frame with a generally "T" shaped member extending sidewardly on opposite ends thereof and two temple members having means for frictionally gripping and holding the "T" member.

8 Claims, 3 Drawing Sheets

HINGE SYSTEM FOR EYEWEAR

BACKGROUND OF THE INVENTION

1. Field of the Invention

The present invention relates to a new hinge system useful in eyewear frames, and more particularly, relates to a hinge system having a snap interfit to permit easy interchange or replacement of temples.

2. Description of the Art

Eyewear, such as sunglasses or spectacles, typically comprise a front frame for holding at least one lens, temples which extend out and over the ear of the wearer, and hinges for attaching the temples to the front frame. Conventionally, the front frames comprise a pair of rims each holding a lens and attached by a bridge and/or brace. More recently, the front frames comprise a top member which holds a single unitary lens. Hinges typically consist of two interlocking pieces, one attached to the front frame through either a rim or a top member, and the other attached to the temple, also referred to as an ear stem. The interlocking pieces are connected by a tongue and groove relationship and held together using conventional fasteners such as screws.

With the increased level of sports activity enjoyed today, eyewear, and particularly sunglasses, have been developed to meet the needs of the active wearer. For example, interchangeable eyewear components are now available so that the wearer may change the eyewear to meet their needs based on level of activity and environmental conditions. More specifically, lenses can be interchanged to better compensate for varying light conditions such as early morning, mid day, and late evening sunlight. Temples have also been designed which are interchangeable to meet the wearer's requirements. One such temple can be a conventional paddle temple which is comfortable during leisure, but will not securely hold the eyewear on the wearer's head during active movement. A second such temple can be a cable temple which provides the secure attachment needed when engaged in rapid movement or activities, but which can sometimes be uncomfortable. Finally, interchangeable eyewear components have also been developed for aesthetic purposes allowing the wearer to change colors or styles of the components as desired.

Other hinge systems have been developed for interchangeable temples. For example, U.S. Pat. Nos. 2,210,507, 4,730,915 and 4,824,233 disclose an interchangeable ear stem or temple having a snap interfit wherein the interfit members have a tongue and groove configuration. The frame or temple has outwardly extending flanges spaced vertically from each other with holes which can receive mating projections attached to the other member. However, this system has not proved to be entirely satisfactory since the flanges, holes and projections are highly susceptible to wear and/or breakage and the temples are generally difficult to remove when the projections are large or fit too tightly in the holes.

The present invention provides a novel hinge system with a snap interfit construction which permits easy removal and replacement of the temple yet provides a secure attachment of the temple to the front frame. Further, the invention provides a hinge system which is easy to manufacture. Moreover, this invention provides for a hinge system which is simple to use and which the design makes apparent to the user the manner in which the hinge system functions. Last, the present hinge system can be easily constructed from various metals or plastics.

SUMMARY OF THE INVENTION

A hinge system is provided for an eyewear frame containing a front frame and a pair of temples at opposite ends of the front frame, the hinge system comprising a generally "T" shaped member extending sidewardly on each opposite end of the front frame and having a post which is vertical with respect to said front frame, and a receiving member attached to one end of each of the temples and defining a recess for frictionally receiving and holding the "T" shaped member whereby each of the temples can be swung from a position perpendicular to the front frame to a position parallel to the front frame when the post is engaged within the recess of the receiving members.

Also provided herein is an eyewear frame containing a pair of the hinge systems of the present invention.

DETAILED DESCRIPTION OF THE INVENTION

Figure 1:
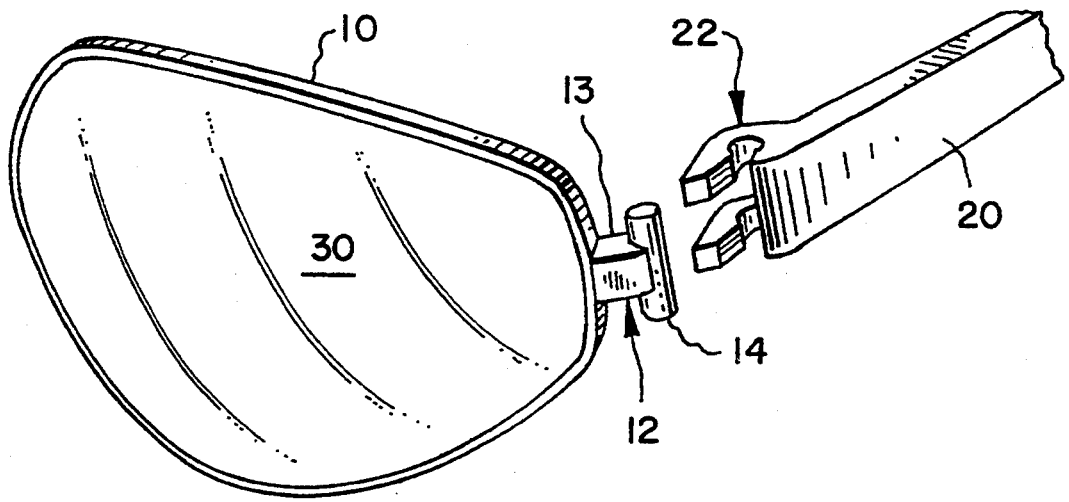
FIG. 1 is a perspective view of one embodiment of the hinge system of the present invention wherein the temple is detached from the front frame.
Figure 2:
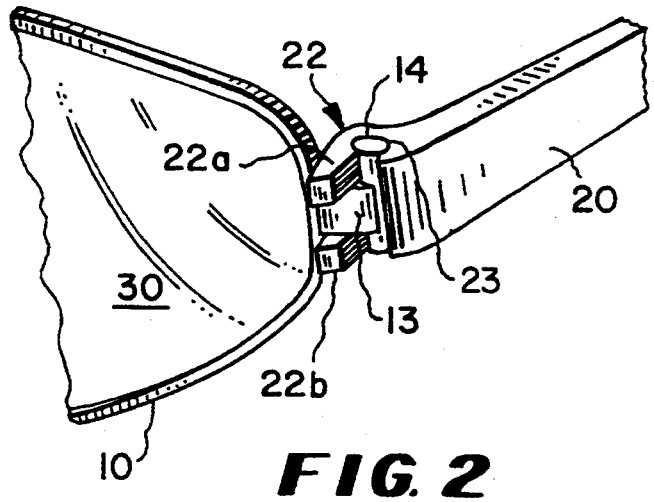
FIG. 2 is a perspective view of the hinge system of FIG. 1 wherein the temple is attached to the front frame.
Figure 3:
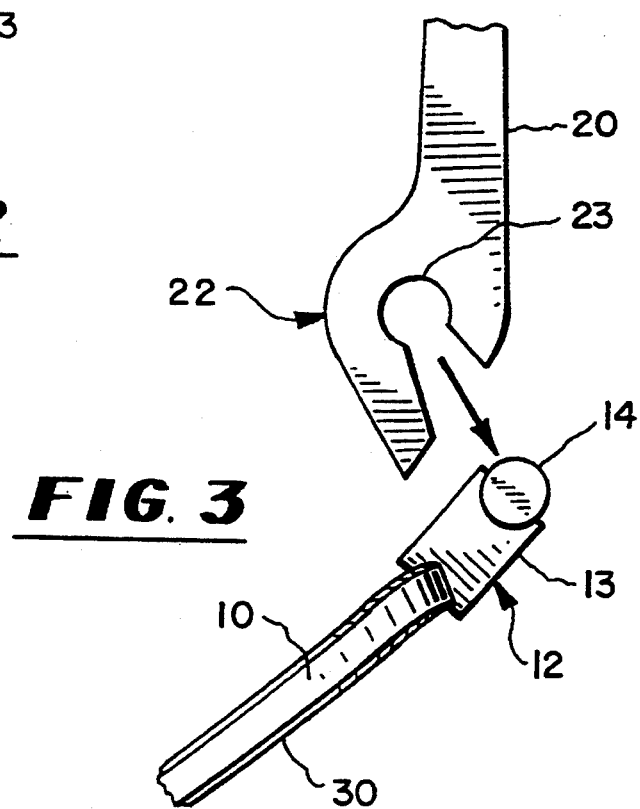
FIG. 3 is a top view of the hinge system of FIG. 1.

Referring now to FIGS. 1-5, shown is one embodiment of the hinge system of the present invention which comprises two members, a hinge member 12 which is attached to the front frame 10 and a receiving member 22 which is attached to a temple 20.

The hinge member 12 comprises a generally "T" shaped member which extends sidewardly from the front frame 10. More specifically, hinge member 12 has connecting element 13 for holding post 14. Front frame 10 can be a rim for holding at least one lens, as shown. In this embodiment, front frame can comprise a conventional dual rim frame as is well known to those skilled in the art. In another embodiment, front frame 10 can be a top frame member or a brow member with separate means for holding at least one lens (not shown). This second embodiment can be a top frame member such as is common in sports sunglasses having a unitary lens attached to the top frame. Generally "T" shaped hinge member 12 extends outwardly from front frame 10 so that post 14 is vertical with respect to front frame 10 when in the normal wearing position.

Figure 6:
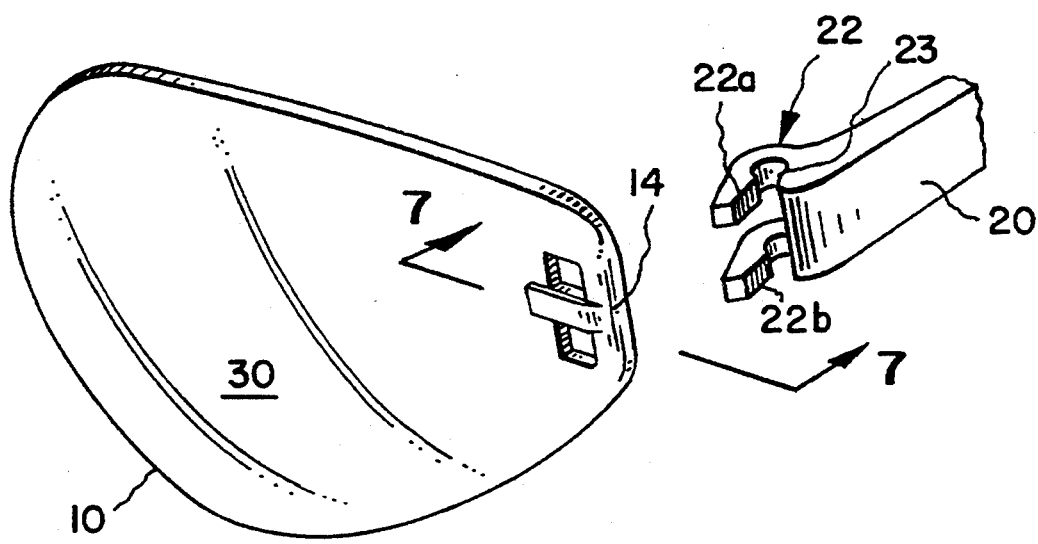
FIG. 6 is a perspective view of the hinge system of another embodiment of the present invention wherein the temple is detached from the lens.
Figure 7:
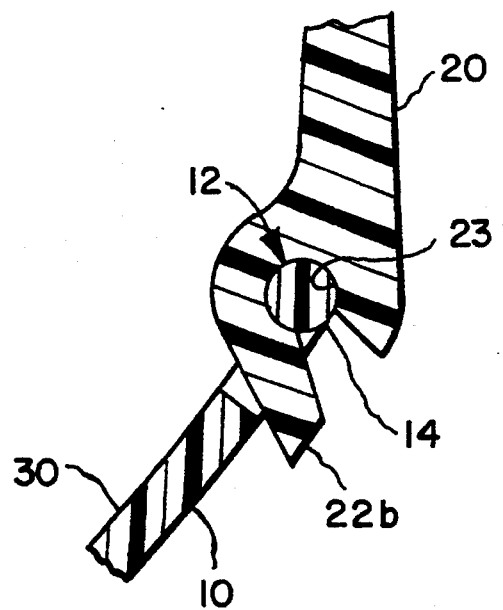
FIG. 7 is a view taken along section lines 7—7 of FIG. 6 showing the temple is attached to the front frame.

Alternatively, generally "T" shaped hinge member can be incorporated into lens 30 as shown in FIG. 6 which represents yet another embodiment of this invention. According to FIG. 6, hinge member 12 is incorporated within lens 30, preferably integrally formed with lens 30, to provide connecting element 13 and post 14.

Post 14 is integral with the vertical edge of lens 30. Preferably, the edge of lens 30 will be thickened or be generally circular to form post 14 to provide a better interfit with recess 23. Lens 30 can be either a unitary lens having a hinge member 12 at its opposite ends, as shown, or can be two lenses with integral hinge member 12 at each temple edge and having separate means for holding the lenses together such as a bridge and/or brace (not shown). When lens 30 incorporates hinge member 12, lens 30 will comprise the front frame as described herein. Thus, as used herein, the term "front frame" will be used to describe a frame for holding at least one lens member (FIGS. 1–5) or the lens itself (FIG. 6). Likewise, reference herein to front frame 10 is intended to include lens 30 when appropriate.

Hinge member 12 can be made of either a suitable metal or plastic but is preferably made of the same material as front frame 10. For example, if front frame 10 is made from a metal wire typically used in eyewear frames, such as steel, nickel, titanium, copper, and alloys thereof, hinge member 12 will be made of the same metal. Front frame 10 can also be made of a moldable plastic, such as polyamides; polycarbonates; celluloses such as acetates, butyrates, and proprionates and similar polymers or copolymers. Hinge member 12 will, preferably, be made from the same plastic as the front frame 10. Optionally, hinge member 12 can be made of a different material from that of front frame 10 and affixed to front frame 10 by brazing, soldering, the use of fasteners, adhesives, or any other suitable means for attaching the two materials. Of course, if hinge member 12 is integral with lens 30 as shown in FIG. 6, it will be made of the same material as the lens; preferably an optical quality plastic such as polycarbonate and the like.

Figure 4:
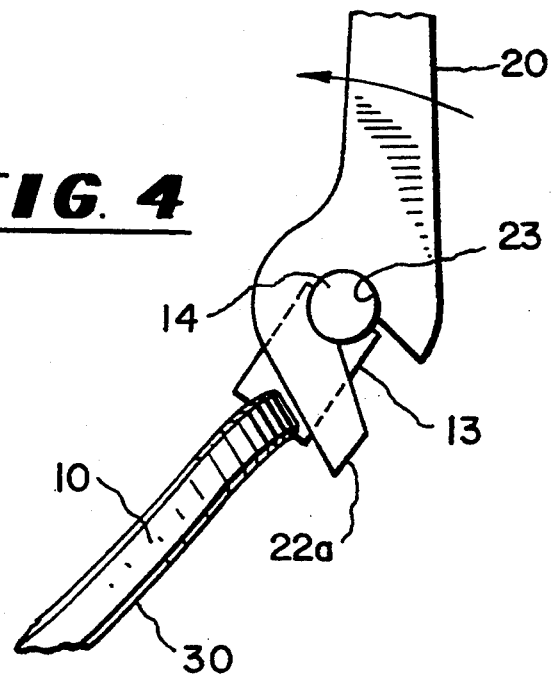
FIG. 4 is a top view of the hinge system of FIG. 2.
Figure 5:
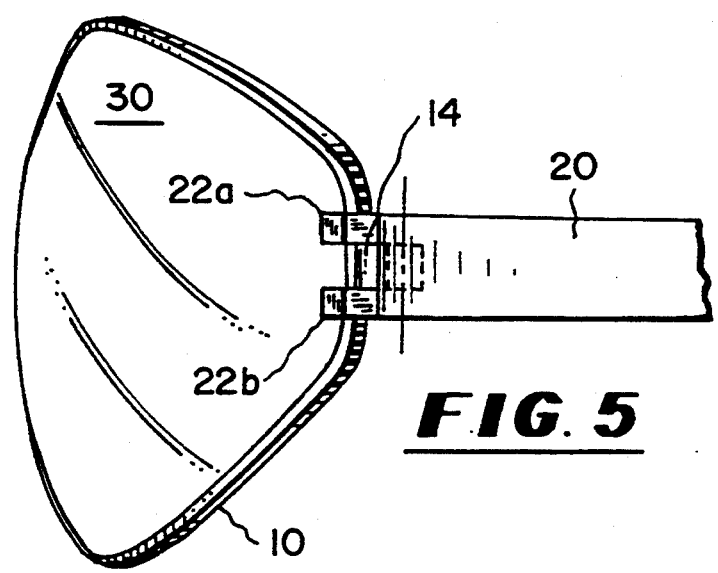
FIG. 5 is a side view of the hinge system of FIG. 2.

The receiving member 22 comprises means for frictionally receiving post 14 and is attached to temple 20. Temple 20 can be a conventional temple having a substantially flat ear piece curved downwardly beginning at a point near its contact point with the ear. Alternatively, temple 20 can be a cable temple made of any flexible material to wrap around the back of the ear as is well known. Other shapes and configurations for temple member 20 can be employed. Receiving member 22 has a generally arcuate shaped element defining a recess 23 for frictionally receiving post 14 of hinge member 12 through a suitable access area. Post 14 fits into recess 23 which acts as a seat allowing post 14 to pivot. Preferably, receiving member 22 has two curved fingers, 22a and 22b, which project substantially tangentially from one side of the arcuately shaped element and which straddle connecting member 13 when post 14 is within recess 23 as shown in FIG. 4. Curved fingers 22a and 22b also restrict the outward movement of temple 20 through contact with front frame 10 and will function as a positive stop. In this manner, temple 20 will remain substantially perpendicular to front frame 10 when the temple 20 is in the open position for placement on the wearer's head. Receiving member 22 can have other configurations which provide for a recess which can accept or mate with post 14.

It is important that post 14 and recess 23 within receiving member 22 have substantially complimentary shapes to form a frictional snap interfit. Preferably, post 14 is cylindrical and recess 23 defines a circle to receive cylindrical post 14.

As described above for hinge member 10, receiving member 22 can be made of any suitable metal or plastic but is preferably made of the same material as temple 20 and is most preferably integral therewith. However, receiving member 22 can be made from a different material than temple 20 and be affixed to temple 20 by any suitable means as described above. Suitable materials for receiving member 22 include metal wires described above and moldable plastics as described above.

During normal use, the present invention provides a hinge system which can be used to interchangeably remove and replace the front frame 10 and the temples 20. Typically, the front frame, containing or comprising at least one lens and preferably two lenses, will have a temple extending sidewardly on opposite ends. The wearer can simple snap a temple 20 containing receiving member 22 on or off of the front frame 10 at their option. In this manner, temples can be forcibly removed and replaced for aesthetic or functional purposes. Likewise, the front frame containing or comprising the lens(es) can also be replaced allowing the use of the same temples. Last, the front frame and temples which employ the hinge system of the present invention are separated during accidental impact, avoiding breakage or injury.

The present invention is not limited by the figures set forth herein or the embodiment specifically disclosed above. It should be understood that the scope of this invention includes all modifications, variations and equivalents which fall within the scope of the attached claims.

What is claimed:

1. A hinge system for eyewear containing a front frame and a pair of temples on opposite ends of said front frame, said hinge system comprising:
    a generally "T" shaped member extending sidewardly on each opposite end of said front frame and having a post which is vertical with respect to said front frame, and
    a receiving member attached to one end of each of said temples comprising at least two arcuately shaped fingers which project perpendicular to said post from a position toward said front frame, said fingers defining segment of a circle by their inner periphery and means for frictionally gripping and holding said post, and which function as a positive stop when said post is within said segment of a circle,
    whereby each of said temples can be swung from a position perpendicular to said front frame to a position parallel to said front frame when said post is engaged within said receiving member.

2. The hinge system of claim 1 wherein said receiving member comprises a snap interfit member allowing forcible removal and replacement.

3. The hinge system of claim 2 wherein said post and said arcuate shaped element have substantially complimentary shapes.

4. An eyewear frame comprising:
    a front frame comprising at least one lens having hinge members integrally within said lens and extending sidewardly from opposite ends of said front frame, each of said hinge members having a post which is vertical with respect to said front frame, and
    a pair of temples each having an inner end for attachment to one of said hinge members and an outer end extending over the ear of the wearer, said inner end comprising a receiving member having outwardly extending fingers for frictionally gripping and holding said post.

5. The eyewear frame of claim 4 wherein each of said receiving members are integral with said temples.

6. The eyewear frame of claim 4 wherein each of said fingers extending outwardly from a position toward said front frame.

7. The hinge system of claim 4 wherein the receiving member further comprises at least two fingers which extend from one side of a substantially arcuate shaped element which defines a segment of a circle by its inner periphery.

8. The hinge system of claim 7 wherein said post and said segment of a circle have substantially complimentary shapes to provide for a snap interfit.

* * * * *